United States Patent [19]

Braun

[11] 4,191,976
[45] Mar. 4, 1980

[54] CIRCUIT INDICATING PHASE RELATIONSHIP

[75] Inventor: William A. Braun, Acton, Mass.

[73] Assignee: Data General Corporation, Westboro, Mass.

[21] Appl. No.: 945,980

[22] Filed: Sep. 26, 1978

[51] Int. Cl.² .................................................. G11B 5/09
[52] U.S. Cl. ........................................ 360/51; 331/12
[58] Field of Search ....................... 331/11, 12; 360/51

[56] References Cited

U.S. PATENT DOCUMENTS

| | | | |
|---|---|---|---|
| 4,005,477 | 1/1977 | Ottesen | 360/51 |
| 4,055,814 | 10/1977 | Abraham et al. | 360/51 |
| 4,156,204 | 5/1979 | Hargis | 331/12 |

*Primary Examiner*—Vincent P. Canney
*Attorney, Agent, or Firm*—Joel Wall; Gary D. Clapp

[57] ABSTRACT

There is disclosed a circuit for providing a comparison signal representing phase relationship between a clock pulse train and a variable rate input pulse train. The comparison signal can be used to synchronize clock and input pulse trains. The circuit includes a phase difference measuring circuit providing a first signal proportional to phase difference between input pulse train and clock pulse train, the signal having related discontinuities at the points of minimum and maximum phase difference between input and clock pulse trains. A second signal is generated representing a selected value of phase difference, the selected value being greater than the minimum phase difference and less than the maximum phase difference. First and second signals are then compared to provide a signal representing difference between the measured and selected values of phase difference. The comparison signal thereby avoids the discontinuities at minimum and maximum values of phase difference by representing phase relationship between input and clock pulse trains relative to the selected value of phase difference rather than to the maximum or minimum values. In a preferred embodiment, decoding circuitry decodes an input pulse train in self-clocking code to provide data output in binary code.

20 Claims, 5 Drawing Figures

CIRCUIT INDICATING PHASE RELATIONSHIP

BACKGROUND OF THE INVENTION

1. Field of the Invention

This invention relates to circuitry used, e.g., to generate a clock signal in phase synchronization with an input signal thereto, and, more particularly, to circuitry used therein to provide a comparison signal indicating phase relationship between input signal and clock signal.

2. Description of Prior Art

Phase-locked loop circuits are commonly used in digital data systems to provide a data clock locked in phase synchronization with data bits in a serial digital data stream, the data clock being phase-locked to either a separate input clock signal or to the data bits of the data stream itself. In general, a phase detector circuit compares input and clock signals and provides a control signal to a voltage-controlled oscillator (VCO) generating the clock signal. The control signal controls frequency and phase of the clock signal in such a manner that clock and input signals are locked in phase synchronization. An example of such a phase locked loop is shown in Dunn, U.S. Pat. No. 4,069,462, incorporated herein by reference.

When, e.g., data is read out of a rotating magnetic memory, such as a Data General Corporation Model 6063, 6064, or 6065 disc drive unit, the data often appears in a self-clocking code format at variable data rates of up to 7.2 megabits per second. Clock information is contained within the format of the self-clocking code, rather than being provided as a separate signal, and the data clock is phase locked to the data stream. In modified frequency modulation (MFM) code format frequently used in rotating disc memories, the data stream is divided into equal imaginary time intervals, called bit cells. A data pulse will be present in the middle of each bit cell containing a logic 1 data bit, and at the boundary between consecutive bit cells containing logic zero data bits. A property of this coding scheme is that the instantaneous frequency of the data stream, i.e., a frequency related to time interval between consecutive data pulses, lies within a comparatively narrow band of frequencies. If the data rate is F, the lowest instantaneous frequency will be F/2, corresponding to a data stream of 101010, and so on. The highest instantaneous frequency will be F, corresponding to a data stream of 000, and so on, or 111, and so on. There is also an intermediate frequency of $\frac{2}{3}$ F, corresponding to a data stream of 100100, and so on. In MFM code, then, input signal frequencies will lie in the band of F/2 to F and will be harmonically related to a frequency twice the data rate.

The phase-locked loop circuit should therefore be capable of harmonic lock to any input signal frequency component. The clock signal should therefore have a frequency at least twice the data rate, but should not have a frequency higher than twice the data rate; it is difficult to obtain adequate performance in VCOs at frequencies more than twice the data rates of modern disc drive units, e.g., 7.2 megabits per second. Additionally, the circuit should not require adjustment of its component values to ensure proper operation. It should not require input or clock signals having well defined pulse widths or shapes, and should be tolerant of variations in data pulse location within bit cells. As a further requirement, the circuit should be capable of reliability and simply decoding MFM coded input signals to provide a data signal output in binary code.

Whether the above requirements are met is primarily a function of the phase detector circuit, and secondarily of the voltage-controlled oscillator. A recurring problem in phase detectors arises from the periodic character of phase error between clock and input signals. Phase error is zero when clock and input signals are in phase and increases to a maximum value as clock signal shifts in time relative to input signal. When the shift equals one complete cycle of input signal, the signals are again in phase and phase error abruptly changes from maximum to zero. Phase error is therefore at the point of switching between minimum and maximum values when clock and input signals are in phase. This condition is unstable, so that the clock signal would tend to oscillate about the point of phase synchronization. Previous phase comparators have avoided this problem, but in doing so have required clock signals four to eight times the input signal frequency or have been dependent upon pulse width and shape.

The present invention provides a solution to these problems of the prior art as will be discussed in detail hereinbelow.

SUMMARY OF THE INVENTION

The present invention relates to a circuit for providing a comparison signal representing phase relationship between a clock pulse train and a variable rate input pulse train. The comparison signal can be used to synchronize clock and input pulse trains. The circuit includes a phase difference measuring circuit providing a first signal proportional to phase difference between input pulse train and clock pulse train, the signal having related discontinuities at the points of minimum and maximum phase difference between input and clock pulse trains. A second signal is generated representing a selected value of phase difference, the selected value being greater than the minimum phase difference and less than the maximum phase difference. First and second signals are then compared to provide a signal representing difference between the measured and selected values of phase difference. The comparison signal thereby avoids the discontinuities at minimum and maximum values of phase difference by representing phase relationship between input and clock pulse trains relative to the selected value of phase difference rather than to the maximum or minimum values.

It is thus advantageous to incorporate the present invention into a phase detector circuit, and particularly into a phase lock loop circuit intended to provide a clock signal in phase synchronization with an input signal, because the comparison signal representing phase difference between input and clock signals has no discontinuities at or near the point of phase synchronization. It is further advantageous to incorporate the present invention into a phase lock loop providing a data clock phase synchronized to an input data stream in self-clocking code because, in addition to the above advantage, the circuit allows simplified decoding of the input data stream to provide an output in binary code. The present invention is further advantageous in the above applications because the clock signal generated by the VCO is required to have a frequency only twice the maximum frequency of the input signal. The preferred phase detector and VCO circuits do not require adjustment of their component values, nor do they require input or clock signals having well-defined pulse width or shapes. Additionally, the decoding circuitry is tolerant to variations in data pulse location within bit cells.

It is thus an object of the present invention to provide an improved phase detector circuit.

It is another object of the present invention to provide an improved phase locked loop circuit.

It is yet another object of the present invention to provide an improved clock generator circuit for use with rotating magnetic memories to provide a data clock and a decoded data output phase synchronized with the data stream output of the memory.

Other objects and advantages of the present invention will be understood by those of ordinary skill in the art, after referring to the detailed description of the preferred embodiments and the drawings herein.

DESCRIPTION OF THE PREFERRED EMBODIMENTS

An interconnection description of a preferred embodiment of the present invention and a data processing system employing the invention is presented first, followed by a description of the operation of the preferred embodiment, and data processing system.

Figure 1:
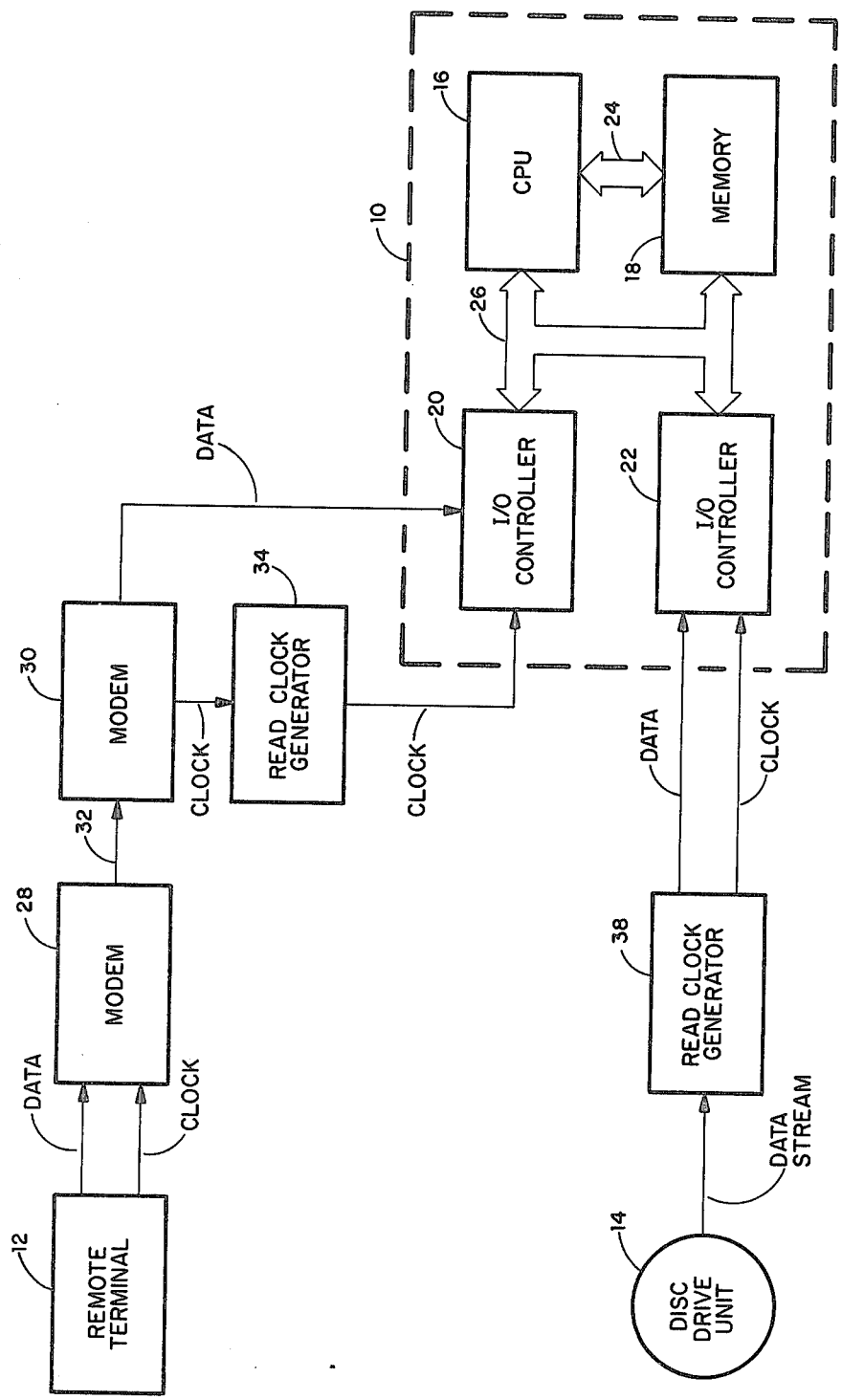
FIG. 1 is a functional block diagram of a digital data processing system in which the present invention is employed.

Referring to FIG. 1, there is disclosed a functional block diagram of the data processing system. Computer 10 includes central processing unit (CPU) 16, memory 18, and input/output (I/O) controllers 20 and 22. CPU 16 and memory 18 are interconnected by data bus 24 and I/O controllers 20 and 22 are interconnected with CPU 16 and memory 18 by I/O busses 26. Remote terminal 12 provides data and clock outputs to modem 28 which is connected to modem 30 via communications link 32. Modem 30 provides a data output to I/O controller 20 and a clock output to read clock generator 34, which in turn provides a clock output to I/O controller 20. Disc drive unit 14 provides a data stream output to read clock generator 38, which provies data and clock outputs to I/O controller 22. Other devices, well known in the art, are connected to I/O controllers 20 and 22 for transfer of data from computer 10 to remote terminal 12, disc drive unit 14, and other similar devices, and are not shown to enhance the clarity of the presentation.

Figure 2:
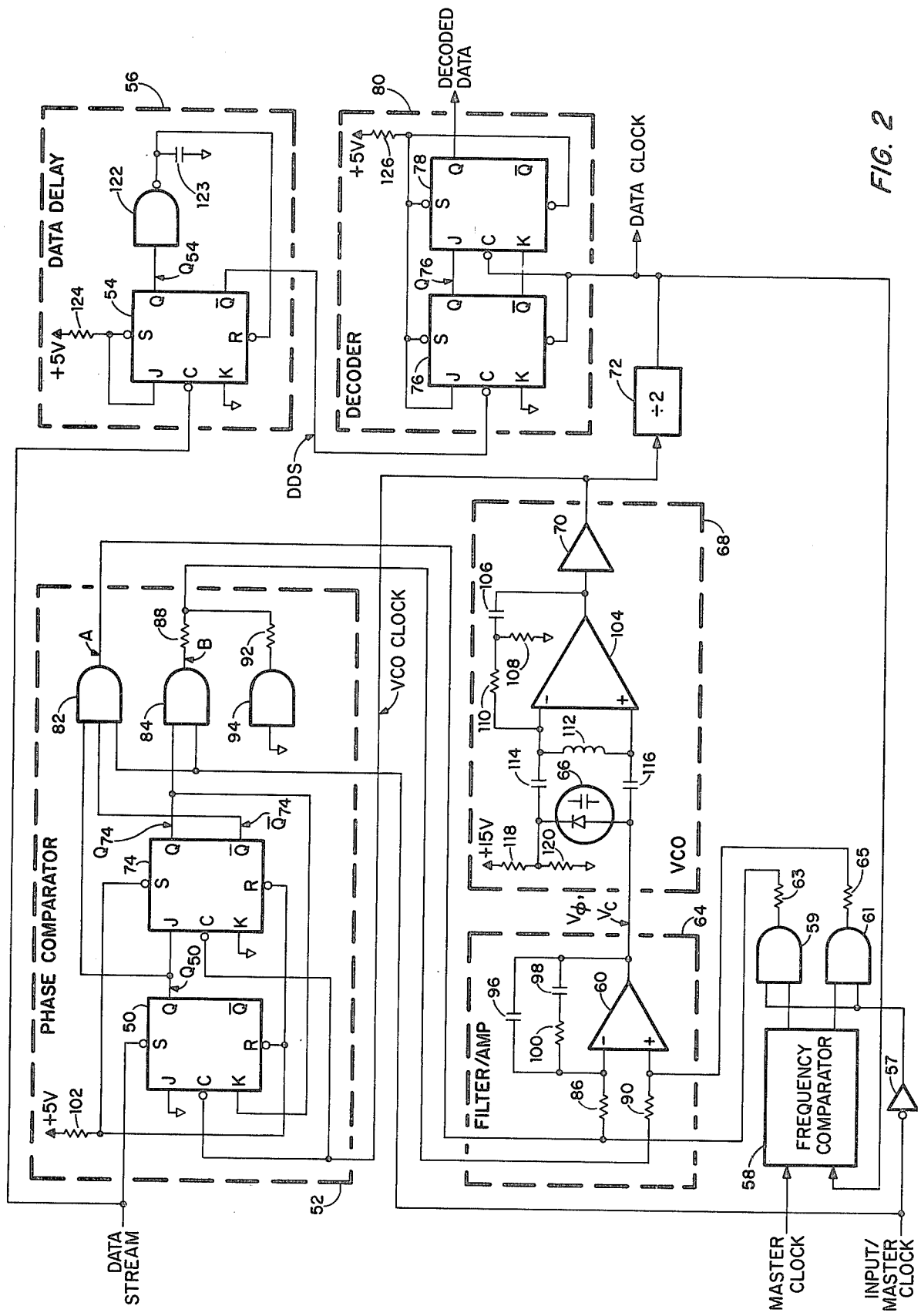
FIG. 2 is a block diagram, partly in schematic form, of circuitry employed in the read clock generators of FIG. 1.

Referring to FIG. 2, therein is disclosed a block diagram, partly in schematic form, of a preferred embodiment of read clock generators 34 and 38 of FIG. 1 wherein the invention is employed. FIG. 2 shows, in part, a dual mode phase locked loop similar to, but significantly differing, from that described in Dunn, U.S. Pat. NO. 4,069,462, incorporated herein by reference above. FIG. 2 discloses in particular read clock generator 38 as employed to read digital data out of disc drive unit 14. Read clock generator 38 will be described first on the block diagram level, and a detailed description of the circuitry shown in FIG. 2, i.e., phase comparator 52, filter/amplifier 64, VCO 68, data delay circuit 56 and decoder 80 will follow.

The digital data stream from disc drive unit 14 is connected to flip-flop 50 set input (S) in phase comparator 52, and to flip-flop 54 clock input (C) in data delay circuit 56. A master clock signal (from a source not shown for purposes of clarity of presentation) is applied to an input of frequency comparator 58. Gate 82 and 84 outputs of phase comparator 52 are connected, respectively, through resistors 86, 88, and 90 to amplifier 60 inverting and non-inverting inputs of filter/amplifier 64. Frequency comparator 58 outputs are connected, through gates 59 and 61 and resistors 63 and 65 to amplifier 60 inverting and non-inverting inputs. An Input/-Master Clock Selection signal (I/M) (from a source not shown for purposes of clarity of presentation) is applied to inputs of gates 82 and 84. I/M is inverted by inverter 57 and applied to inputs of gates 59 and 61. Filter/amplifier 64 output is connected to the lower end of varicap diode 66 in VCO 68. Buffer amplifier 70 output in VCO 68 is connected to frequency divider 72 input, and to flip-flop 50 and 74 clock inputs in phase comparator 52. Frequency divider 72 output is provided as data clock output of generator 38, and is connected to flip-flop 76 reset input (R) and flip-flop 78 clock input in decoder 80 and to an input of frequency comparator 58. Flip-flop 54 $\overline{Q}$ output in data delay circuit 56 is connected to flip-flop 76 clock input in decoder 80, and flip-flop 78 Q output in decoder 80 is provided as decoded data output of generator 38.

The detailed circuitry of phase comparator 52, filter/amplifier 64, VCO 68, data delay circuit 56, and decoder 80 will now be described. Turning first to phase comparator 52 and filter/amplifier 64, as described above the data stream from disc drive unit 14 is connected to flip-flop 50 set input and buffer amplifier 70 output of VCO 68 is connected to flip-flop 50 and 74 clock inputs. Flip-flop 50 Q output is connected to flip-flop 74 J input, and to one input of AND gate 82. Flip-flop 74 $\overline{Q}$ output is connected to an input of AND gate 84, and to flip-flop 50 K input. Flip-flop 74 $\overline{Q}$ output is connected to another input of AND gate 84, and to flip-flop 50 K input. Flip-flop 74 Q output is connected to another input of AND gate 82. AND gate 82 output is connected through resistor 86 to amplifier 60 inverting input and AND gate 84 output is connected through resistors 88 and 90 to amplifier 60 non-inverting input. The junction of resistors 88 and 90 are connected through resistor 92 to AND gate 94 output and an input of AND gate 94 is connected to ground. Amplifier 60 output is connected through feedback network comprising capacitors 96 and 98 and resistor 100 to amplifier 60 inverting input and, as described above, to varicap diode 66 in VCO 68. Returning to the connections of flip-flops 50 and 74, flip-flop 74 set and reset inputs, and flip-flop 50 reset input, are connected to a logic one voltage level provided through resistor 102, which is connected to a +5 volt supply. Flip-flop 50 J input and flip-flop 74 K input are connected to ground.

Turning now to VCO 68, as described above the lower end of varicap diode 66 is connected to filter/amplifier 64 output and buffer amplifier 70 output is connected to inputs of phase comparator 52 and divider circuit 72. Comparator 104 output is connected to buffer amplifier 70 input and, through a feedback network comprising capacitor 106 and resistors 108 and 110, to comparator 104 inverting input. A frequency determining network comprising varicap diode 66, inductor 112, and capacitors 114 and 116 is connected between comparator 104 inverting and non-inverting inputs. Resistor 118 is connected from the junction of varicap diode 66 and capacitor 114 to a +5 volt supply, and resistor 120 is connected from that junction to ground.

Referring now to data delay circuit 56, flip-flop 54 clock input is connected to the digital data stream from disc drive unit 14 and flip-flop 54 $\overline{Q}$ output is connected to flip-flop 76 clock input in decoder 80. Flip-flop 54 Q output is connected to the input of NAND gate 122 and gate 122 output is connected to flip-flop 54 reset input. Flip-flop 54 K input is connected to ground and flip-flop 54 J and set inputs are connected to a logic 1 voltage level provided through resistor 124, which is connected to a +5 volt supply.

Turning finally to decoder 80, as described flip-flop 76 clock input is connected to flip-flop 54 Q output and flip-flop 76 reset input and flip-flop 78 clock input are connected to data clock output of divider 72. Flip-flop 76 Q output is connected to flip-flop 78 J input and flip-flop 76 $\overline{Q}$ output is connected to flip-flop 78 K input. Flip-flop 78 Q output is provided as decoded data output of generator 38. Flip-flop 76 K input is connected to ground and flip-flop 76 J and set inputs and flip-flop 78 set and reset inputs are connected to a logic one voltage level provided through resistor 126, which is connected to a +5 volt supply.

Phase comparator 52, filter/amplifier 64, VCO 68, data delay circuit 56, and decoder 80 includes further components which are well-known to one ordinarily skilled in the art, e.g., compensation capacitors for amplifier 60 and comparator 104, which are not shown to enhance the clarity of presentation.

In operation, referring again to FIG. 1, terminal 12 provides a digital data stream and a clock to modem 28, where they are converted to a form suitable for transmission over transmission link 32 to modem 30. The transmitted data and clock are received by modem 30 and re-converted back to their original form, as provided at the output of terminal 12. Modem 30 provides a data output directly to the data input of I/O controller 20, and provides a clock output to read clock generator 34. Read clock generator 34, whose operation will be described below in conjunction with the operation of read clock generator 38, regenerates the clock signal and provides a data clock output to I/O controller 20. I/O controller 20 then transfers the data through I/O bus 26 to CPU 16 and memory 18. The data input from disc drive unit 14, digital data is stored on the rotating magnetic disc of unit 14 in MFM code and is read out of unit 14 and provided as a data stream to read clock generator 38. As will be further described below, generator 38 generates a data clock phase locked to the digital data stream and decodes the data stream to provide a decoded data output. The decoded data output and data clock from generator 38 are provided to I/O controller 22, whereby the digital data is transferred through I/O bus 26 to CPU 16 and memory 18.

The operation of read clock generator 38 will next be described on a block diagram level, and then the operation of phase comparator 52, filter/amplifier 64, VCO 68, data delay circuit 56, and decoder 80 will be described in detail.

The MFM coded data stream from disc drive unit 14 is applied to flip-flop 50 set input and, as will be discussed below, to flip-flop 54 clock input. A master clock occurring at the expected data rate of the data stream is applied to one input of frequency comparator 58. VCO 68 provides a VCO clock twice the data rate of the data stream at buffer amplifier 78 output; VCO clock is divided by two by divider 72 to provide data clock.

Phase comparator 52 compares data stream and VCO clock and provides comparison signals A and B at gate 82 and 84 outputs, representing phase difference between data stream and VCO clock. Frequency comparator 58 compares data clock and master clock and provides error signals representing frequency and phase error between data and master clocks.

Signal I/M enables gates 82 and 84 to apply phase comparator 52 outputs to amplifier 60 inputs when a data stream is present at comparator 52 input. I/M enables gates 59 and 61 to apply frequency comparator 58 outputs to amplifier 60 inputs when a data stream is not present. The selected outputs are compared, filtered, and amplified to provide contol voltage Vc to VCO 68. Vc determines VCO clock frequency. The feedback control loop comprising VCO 68 and phase comparator 52 or frequency comparator 58, operates to lock VCO clock in phase synchronization with, respectively, data stream or master clock. When the data stream is present, data clock is locked in phase synchronization with data stream. When the data stream is not present, data clock is phase locked to Master Clock; this ensures phase lock, or capture, of VCO 68 by the data stream when a data stream becomes present and control of VCO 68 is switched to phase comparator 52.

Data delay circuit 56 provides a delayed data signal (DDS) corresponding to the data stream but delayed in time by an amount approximating phase delay through divider 72. DDS appears at flip-flop 54 Q output and is in close phase synchronization with data clock. Decoder 80, as will be described below, decodes delayed data signal to provide a decoded data output in serial binary form corresponding to the data stream.

The detailed operation of phase comparator 52 and filter/amplifier 64 will now be described with the aid of the timing diagram shown in FIG. 3, which depicts waveforms associated with the circuitry of FIG. 2, and the aid of FIG. 4, which depicts VCO control signal voltage/phase relationships illustrating the operation of the present invention. The timing diagram will be described first, followed by a discussion of the operation of phase comparator 52. The principles of operation of the present invention will then be discussed with the aid of FIG. 4, followed by a description of further features of the invention, including additional features of phase comparator 52 and the operation of data delay circuit 56 and decoder 80.

Figure 3:
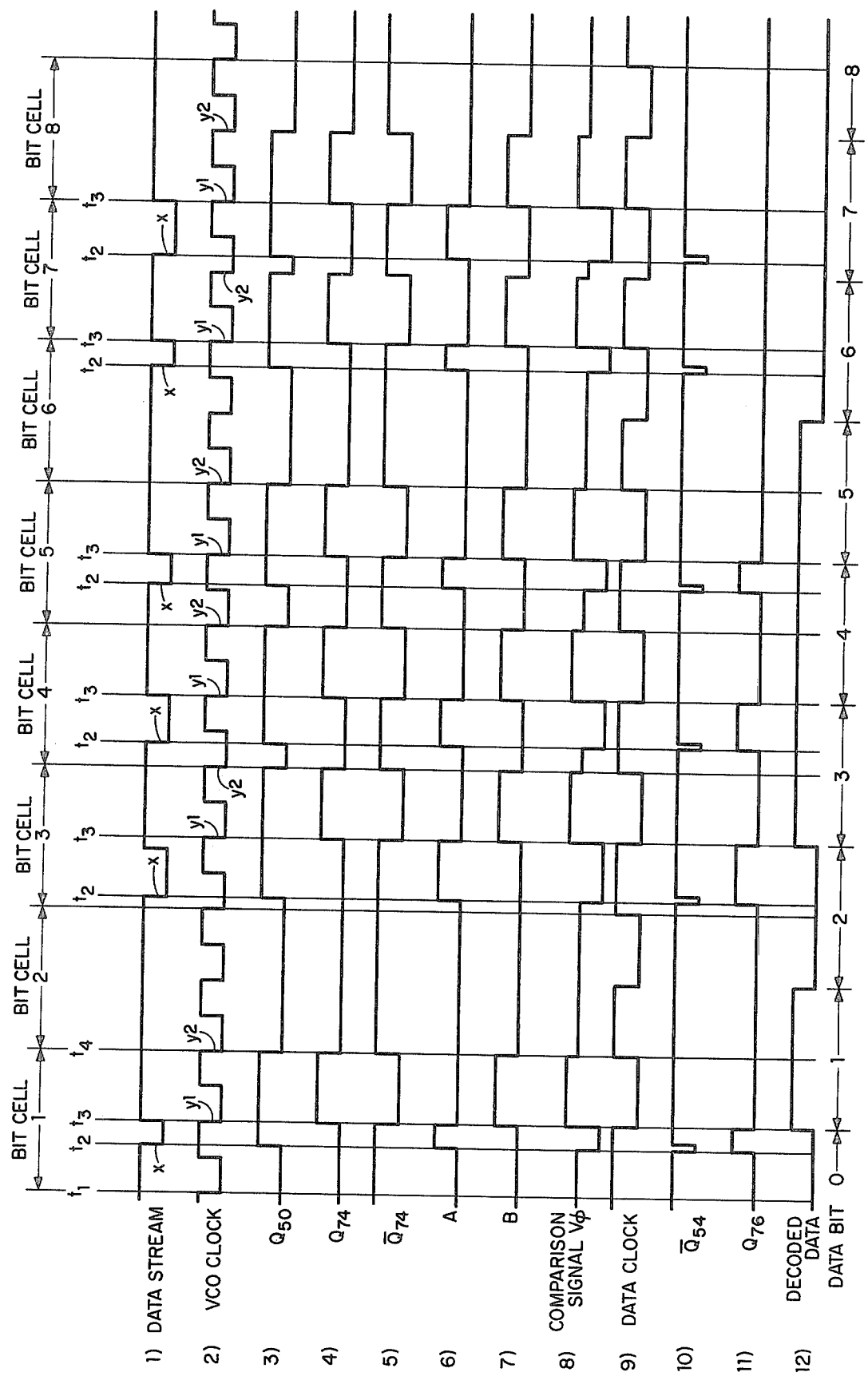
FIG. 3 is a timing diagram depicting waveforms associated with the circuitry of FIG. 2; and, FIG. 4 including 4a, depicts VCO control signal voltage/phase relationships illustrating the operation of the present invention.
Figure 4:
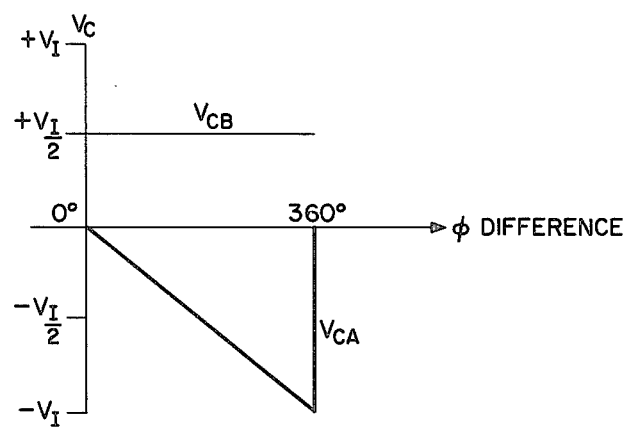

Turning now to FIGS. 2 and 3, line 1 of the timing diagram shows the MFM coded data stream applied to flip-flop 50 set input and flip-flop 54 clock input. Bit cells of the data stream (bit cell 1 through bit cell 8) are indicated on the timing diagram to aid in understanding the following discussion. The bit cells are imaginary or virtual markings and are, in effect, defined by the location of data pulses in the data stream. The data stream shown here, reading from left to right in direction of increasing time, represents binary data sequence 101110001. As shown and discussed further below, each data pulse has a timing edge X which may occur at any point in an allowed range of tolerance within the bit cell, and each data pulse may vary in width and shape. Line 2 shows VCO clock as it appears when in phase synchronization with data stream; each VCO clock pulse has a timing Y edge at the trailing edge of the clock pulse. As shown herein, and will be discussed below, VCO clock need not be comprised of square wave pulses and each pulse may vary in width and shape. Line 3 depicts signal Q50 present on flip-flop 50 Q output. Lines 4 and 5 depict respectively signals Q74 and $\overline{Q}_{74}$ present on flipflop 74 Q and $\overline{Q}$ outputs. Lines 6 and 7 depict signals A and B present, respectively, on AND gate 82 and 84 outputs. Line 8 represents a comparison signal V$\phi$ which would be present on amplifier 60 output if amplifier 60 were operated only as a comparator. The signal actually present on amplifier 60 output is Vc, which represents the amplified and filtered (integrated) value of V$\phi$. V$\phi$ is shown for illustrative purposes to enhance the clarity of presentation.

The operation of phase comparator 52 and filter/amplifier 64 during the time interval of bit cell 1 (between $t_1$ and $t_4$) will now be described.

Referring to lines 1 through 7 of the timing diagram, at $t_1$ the data stream, VCO clock, and signals Q50, Q74, A, and B, are logic 0 and signal $\overline{Q}_{74}$ is logic 1. At time $t_2$, data stream goes to logic 1 at timing edge X; timing edge X operates upon flip-flop 50 set input to cause Q50 to go from logic 0 to logic 1. A also goes from logic 0 to logic 1 at $t_2$ because Q50 and $\overline{Q}_{74}$ into AND gate 82 are both logic 1 at this time. At time $t_3$, VCO clock, which had gone from logic 0 to logic 1 at some point between times $t_1$ and $t_3$, goes from logic 1 to logic 0 to provide timing edge $Y_1$. Timing edge $Y_1$ operates on flip-flop 74 clock input to clock the logic 1 of Q50 into flip-flop 74 so that Q74 and, consequently, B, go from logic 0 to logic 1. $\overline{Q}_{74}$ goes from a logic 1 to a logic 0 at this time, causing A to change from logic 1 to logic 0. Timing edge $Y_1$ does not affect flip-flop 50 because $\overline{Q}_{74}$ into flip-flop 50 K input is a logic 0 at the time edge $Y_1$ occurs. At time $t_4$, timing edge $Y_2$ of VCO clock operates on flip-flop 50 and 74 clock inputs to cause Q50 and Q74 to go from logic 1 to logic 0 and $\overline{Q}_{74}$ to go from logic 0 to logic 1, causing, in turn, B to go from logic 1 to logic 0. The occurrence of a data pulse thereby results in a pulse A and a pulse B appearing respectively at AND gate 82 and 84 outputs.

Turning now to lines 6, 7, and 8, pulse A is applied through resistor 86 to amplifier 60 inverting input and pulse B is divided in amplitude by two by the resistor divider comprising resistors 88 and 92 before being applied through resistor 90 to amplifier 60 non-inverting input. Amplifier 60 operates, in part, as a comparator wherein pulse A input is subtracted from half amplitude pulse B input, as represented by comparison signal V$\phi$ appearing on line 8. V$\phi$ is 0 between time $t_1$ and $t_2$. At time $t_2$ (when timing edge X occurs and A goes from logic 0 to logic 1), V$\phi$ goes from 0 volts to $-V$ volts. V$\phi$ remains at $-V$ volts for the duration of pulse A and at time $t_3$ (i.e., timing edge $Y_1$ when pulse A terminates and the pulse B begins) goes from $-V$ volts to $+\frac{1}{2}$ volts. V$\phi$ remains at $+\frac{1}{2}$ V volts until time $t_3$ when timing edge $Y_2$ occurs and pulse B is terminated, returning at this time to 0 volts.

The above operation is repeated for each data pulse of the input data stream, thereby causing an A and a B pulse, and a corresponding V$\phi$, to occur for each data pulse. The width of pulse A, and of the corresponding $-V$ portion of V$\phi$, are equal to the time interval between timing edge X of the data pulse and timing edge $Y_1$ of the next occurring VCO clock pulse. The width of the immediately following pulse B, and of the corresponding $+\frac{1}{2}$ V portion of V$\phi$, are equal to the time interval between VCO clock timing edge $Y_1$ and the next succeeding VCO clock timing edge $Y_2$. As will be discussed below, the width of pulse A represents phase difference between timing edge X of a data pulse and timing edge $Y_1$ of the next VCO clock pulse. The width of pulse B, by being equal to the interval between succeeding VCO clock timing edges represents the maximum possible value of phase difference, and the corresponding portion of V$\phi$ represents $\frac{1}{2}$ of that maximum value.

Figure 4A:
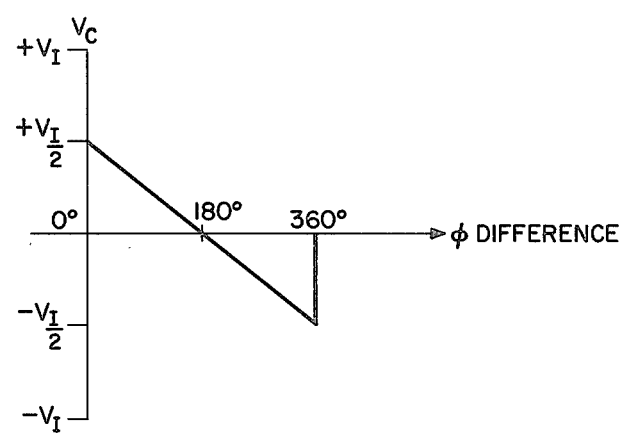

The principle of operation of the present invention will now be described with the aid of FIG. 4 and the above discussion. As previously described, the A and B inputs to filter/amplifier are filtered and amplified to provide control voltage Vc to VCO 68. Vc, the signal actually present on amplifer 60 output, thereby represents the average of the areas under the A and B portions of V$\phi$, i.e., the average of the products of the amplitudes and widths of A and B portions of V$\phi$. The contributions of the A and B portions of V$\phi$ to Vc are shown individually in FIG. 4. $V_{CA}$ represents the contribution of pulse A and $V_{CB}$ represents the contribution of pulse B. Referring to $V_{CA}$, as phase difference between data stream and VCO clock increases from 0°, the minimum value, to 360°, the maximum value, $V_{CA}$ decreases from 0 volts to a maximum value of $-V_1$. At 360° $V_{CA}$ returns to 0 volts due to the periodic characteristic of phase difference as described above (i.e., a phase difference of 360° equals a phase difference of 0°). Referring to $V_{CB}$, the width of the B portion of V$\phi$ is equal to the maximum possible value of phase difference but the amplitude of the B portion of V$\phi$ is $\frac{1}{2}$ that of the A portion. The width of pulse B varies only with VCO clock frequency, so that for a given data rate the contribution to the Vc by the B portion is substantially a constant voltage equal to $+\frac{1}{2}$ of $V_I$, representing $\frac{1}{2}$ of the maximum possible phase difference (i.e., a phase difference of 180°). Referring now to FIG. 4a, therein is depicted Vc as a function of phase difference between data stream and VCO clock; Vc is the sum of $V_{CA}$ and $V_{CB}$ of FIG. 4. Vc has a value of $+\frac{1}{2}$ $V_I$ at 0° phase difference and decreases linearly to a value of $-\frac{1}{2}$ $V_I$ at 360° phase difference, having a value of 0 volts at 180° phase difference. At 360° phase difference, Vc returns to a value of $+\frac{1}{2}$ $V_I$, reflecting the periodic nature of phase difference as previously described.

Vc was previously described as representing phase relationship between data stream and VCO clock and controlling the frequency of VCO clock in such a manner as to bring VCO clock into phase synchronization with data stream. VCO 68, which will be described further below, is designed to provide VCO clock at twice the data rate of the data stream, and thus data clock at the data rate, when Vc is 0 volts. If VCO clock occurs ahead of or behind the desired point of phase synchronization with respect to data stream, Vc will increase or decrease from 0 volts by an amount proportional to the phase error, causing VCO clock frequency to respectively decrease or increase until VCO clock is at the desired point of phase synchronization. Referring to FIGS. 4 and 4a, Vc is 0 volts when there is a 180° phase difference between the timing edges of the data and VCO clock pulses, i.e., at the point where the contributions to $V_C$ by $V_{CB}$ and $V_{CA}$ are of equal magnitude. Considering lines 1, 2, 6, 7, and 8 of the timing diagram, $V_{CB}$ and $V_{CA}$ are equal when the width of pulse A is $\frac{1}{2}$ the width of pulse B so that the areas under the A pulse and half amplitude B pulse inputs to amplifier 60 are equal. The width of pulse B is determined by VCO clock frequency, but the width of pulse A is dependent upon the location of timing edge X of the data pulse with respect to timing edges Y of VCO clock pulses, so that width of pulse A will be ½ that of pulse B when the timing edges of data pulses are located midway between the timing edges of VCO clock pulses, corresponding to the desired point of phase synchronization wherein there is a 180° phase difference between data stream and VCO clock.

In accordance with the invention then, the point of phase synchronization can be selected to be removed from discontinuities and can be located midway in the linear portion of the Vc versus phase difference curve shown in FIG. 4a. Vc will vary linearly about this point and, by avoiding points of discontinuity occurring at 0° and 360°, will provide a data clock of substantially enhanced stability. Further in accordance with the invention, this is achieved by measuring phase difference between data stream and VCO clock to provide a first signal (the pulse A component of Vc) proportional to phase difference and having related discontinuities at points of minimum (0°) and maximum (360°) phase difference. A second signal representing a selected value of phase difference (the pulse B component of Vc) is then generated, with the selected value of phase difference being greater than 0 and less than the maximum value, and compared with the first signal to provide a signal (V$\phi$, Vc) representing difference between measured and selected values of phase difference. Vc is then used to control phase of VCO clock relative to data stream so that the point of phase synchronization is located at the selected value of phase difference, thereby avoiding points of discontinuity at 0° and 360° phase difference. While the second signal can be generated by providing a d-c voltage (e.g., from a resistor divider from a d-c voltage supply) to the non-inverting input of amplifier 60, or at any other suitable point in the circuit, it is preferable, as shown in the preferred embodiment, to generate the second signal by measuring the interval between VCO clock pulses so that the second signal is proportional to the actual maximum possible phase difference.

Returning to FIG. 2, and to description of operation of further features of the preferred embodiment of phase detector 52, as discussed above the point of phase synchronization between data stream and VCO clock is determined by relative amplitudes of A and B pulse inputs to amplifier 60. The point of phase synchronization may therefore be selected to be at any point between VCO clock timing edges by selecting the amplitude of the B pulse input, e.g., by varying the ratio between resistors 88 and 92 of the voltage divider. In this regard, AND gates 82 and 84 are preferably contained within the same integrated circuit chip to ensure that the logic 1 and 0 voltages of the gates are of equal amplitude over the entire operating temperature range of the integrated circuits. Also in this regard, the lower end of the resistor divider network is connected to output of AND gate 94 rather than to ground. The input of gate 94, which is preferably contained in the same chip as gates 82 and 84, is connected to ground so that output of gate 94 is logic 0. By referencing the divider network to logic 0, the logic 0 offset of gates 82 and 84 is, in effect, subtracted from the A and B inputs to amplifier 60 to effectively reference these two signals to ground so that output of amplifier 60 is 0 volts when inputs A and B are logic 0. The output voltage levels of gates 82, 84, and 94 are also affected by the loads on their outputs, and resistors 86, 88, 90, 92, 63, and 65 are selected to provide equal loads to the gates.

A further feature of the preferred embodiment of phase comparator 52 allows comparison signal Vc to represent very small values of phase difference. As described above, the A pulse is generated by effectively substracting $Q_{74}$ from $Q_{50}$. The minimum width of the pulse A is thereby determined by the propagation delay through gate 82 rather than by the much greater propagation delay through flip-flops 50 and 74. Additionally, because flip-flops 50 and 74 depend only upon timing edges X and Y of data stream and VCO clock for operation, phase comparator 52 does not require data or VCI clock pulses having well-defined widths or shapes, requiring only that each having a timing edge. The operation of filter/amplifier 64 is enhanced by lead compensation provided by the feedback network connected between the output and inverting input of amplifier 60 to compensate for and effectively cancel the propagation delay through amplifier 60.

Turning now to the operation of the preferred embodiment of VCO 68, comparator 104 is a high-speed comparator ensuring a large loop gain around the oscillator circuit and providing an output waveform suitable for clocking flip-flops 50 and 74 and divider 72. The frequency of VCO clock is determined by the circuit comprising varicap diode 66, which provides a variable capacitance whose value is determined by Vc as described above, and inductor 112. Resistors 118 and 120 form a voltage divider network to provide a constant voltage to the upper end of diode 66, so that the voltage across diode 66, and thus its capacitance, is determined solely by Vc. Capacitors 114 and 116 are DC voltage blocking capacitors to prevent the voltage across diode 66 from appearing upon the inputs of comparator 104.

The use of an inductor-capacitor frequency determining circuit reduces the sensitivity of VCO 68 to variations in component parameters, e.g., variations in the gain and propagation delay of comparator 104. Resistor 110 is selected to have a value much larger than the characteristic impedance of the frequency determining network to ensure oscillation near the resonant peak of the circuit. The lead compensation network comprising capacitor 106 and resistors 108 and 110 is utilized in the feedback loop of VCO 68 to cancel nominal propagation delay through comparator 104, thereby further assuring operation of VCO 68 near the resonant peak of the frequency determining circuit. The circuit described herein provides a VCO whose frequency of oscillation is within 7% of nominal frequency, with all component variations considered, and without the need for additional adjustable components to initially determine the nominal oscillating frequency of VCO 68.

The operation of data delay circuit 56 and decoder 80 will now be described with the aid of FIG. 2 and line 1 and lines 9 through 12 of FIG. 3. As previously described, the function of data delay circuit 56 is to provide a data signal substantially time aligned with data clock. The data stream is applied to flip-flop 54 clock input so that clock edge X of each data pulse operates to clock the logic one present on flip-flop 54 J input into flip-flop 54, thereby causing flip-flop 54 Q output to go from logic 0 to logic 1 and, as shown on line 10, causing signal $\overline{Q}_{54}$ to go from logic 1 to logic 0. The logic 1 on flip-flop 54 Q output is inverted by gate 122 to be applied as a logic 0 on flip-flop 54 reset input, thereby resetting flip-flop 54 so that flip-flop 54 Q output returns from logic 1 to logic 0 and $\overline{Q}_{54}$ goes from logic 0 to logic 1. When flip-flop 54 Q output goes from logic 1 to logic 0, the signal on flip-flop 54 reset input returns to logic 1 thereby releasing the reset of flip-flop 54. Capacitor 123 increases the width of gate 122 output pulse to ensure reset of flip-flop 54. As shown on line 10, for each data pulse there is negative going $\overline{Q}_{54}$ pulse whose leading or negative going edge is delayed in time from timing edge X of the corresponding data pulse by the propagation delay through flip-flop 54 and whose width is equal to the propagation delay through flip-flop 54, gate 122, and capacitor 123.

$Q_{54}$ is applied to flip-flop 76 clock input and data clock is applied to flip-flop 76 reset input. As shown on line 9, when data clock is in phase synchronization with data stream data clock is logic 1 during the first half of each bit cell and logic 0 during the latter half.

If pulse $\overline{Q}_{54}$ occurs during the first half of a bit cell, indicating that the bit cell contains a logic 1 data bit as shown in bit cells 1, 3, 4, and 5, pulse $\overline{Q}_{54}$ will clock the logic 1 present on flip-flop 76 J input into flip-flop 76 so that signal $Q_{76}$ goes from logic 0 logic 1 and the flip-flop 76 $\overline{Q}$ output will correspondingly go from logic 1 to logic 0. $Q_{76}$ will remain at logic 1 until data clock goes to logic 0 midway in the bit cell. Flip-flop 76 is then reset so that $Q_{76}$ goes from logic 1 to logic 0 while flip-flop 76 $\overline{Q}$ output goes from logic 0 to logic 1. If pulse $\overline{Q}_{54}$ occurs during the latter half of a bit cell, indicating that the bit cell contains a logic 0 data bit as shown in bit cells 6 and 7, data clock will hold flip-flop 76 in the reset state and $Q_{76}$ will remain at logic 0 while flip-flop 76 $\overline{Q}$ output remains at logic 1. If, as shown in bit cells 2 and 8, no $\overline{Q}_{54}$ pulse occurs during the bit cell, also indicating a logic 0 data bit in the bit cell, $Q_{76}$ will remain at logic 0 and flip-flop 76 $\overline{Q}$ output remain at logic 1 due to flip-flop 76 having been reset by data clock during the latter half of the previous bit cell. To summarize, $Q_{76}$ will provide a logic 1 pulse during the first half of each bit cell containing a logic 1 data bit but will remain at logic 0 during all bit cells containing a logic 0 data bit; each $Q_{76}$ pulse will be terminated at the falling edge of data clock.

$Q_{76}$, and its inverse appearing on flip-flop 76 $\overline{Q}$ output, are applied to respectively flip-flop 78 J and K inputs. Flip-flop 76 is clocked by the falling edges of data clock to sample $Q_{76}$. If $Q_{76}$ is a logic 1 prior to the falling edge of data clock, a logic 1 will appear on flip-flop 78 Q output and, if $Q_{76}$ is a logic 0 prior to the falling edge of the data clock, a logic 0 will appear on flip-flop 78 Q output. The logic 1 or logic 0 present on flip-flop 78 Q output will remain for the duration of data clock cycle, until flip-flop 78 is next again clocked by data clock. The signal present on flip-flop 78 Q output is provided as decoded data otuput as shown on line 12 of the timing diagram. Each decoded data bit is delayed by ½ bit cell period from the corresponding data stream bit cell i.e., ½ the period of data clock. Decoded data output is thereby in phase synchronization with data clock, with the boundaries between consecutive decoded data bits occurring at the falling edges of data clock.

The preferred embodiment of read clock generator 38 thereby allows MFM decoding to be easily performed to provide a decoded data output in binary form phase synchronized with data clock. As previously discussed, input data streams containing consecutive ones or zeros are, in MFM code, distinguished by the positions of the data bits in the data cells, i.e., near the centers or the edges of the cells. Data clock must therefore be correctly phase synchronized to the data cells to allow ones and zeros to be distinguished to provide the proper decoded data output. This is preferably accomplished by inserting a preamble containing a known data pattern, e.g., all ones or all zeros, at the start of each data stream to establish an initial synchronization between bit cells and VCO clock. The phase locked loop will thereafter operate to maintain the initial synchronization. As a further feature, data delay circuit 56 and decoder 80 are tolerant to variations in width and shape of the input data pulses, requiring only that each data pulse have a timing edge X, and are tolerant to variations in position of data pulses within the bit cells; requiring only that the data pulse timing edge lie within the first half of the bit cell to be correctly interpreted as a logic one data bit and either not be present or lie anywhere in the latter half of the bit cell to be correctly interpreted as a logic 0 data bit.

Turning now to operation of read clock generator 34 and referring to FIGS. 1 and 2, the circuitry shown in FIG. 2 for read clock generator 38 may be utilized to regenerate a data clock which is provided separately from the input data stream. In this case, the clock output of modem 30 would be applied to flip-flop 50 set input in phase comparator 52 and the regenerated data clock would appear at the output of divider 72. Data delay circuit 56 and decoder 80 would not be required in this application since the data stream is not to be decoded. The phase locked loop including phase comparator 52 and VCO 68 would provide all of the features and advantages described avove in relation to the operation of read clock generator 38.

The circuit components used in the circuitry of FIG. 2 in the presently known best mode of practicing the invention disclosed herein are described in the table below.

PARTS TABLE

| | |
|---|---|
| Flip-flop 50, 54, 74, 76, 78 | SN74S112 |
| AND Gate 82, 84, 94, 59, 61 | SN74S10 |
| NAND Gate 122 | SN74S00 |
| Inverter 57 | SN74S04 |
| Amplifier 60 | National Semiconductor LF356 |
| Comparator 104 | Motorola UA 760 |
| Diode 66 | Motorola MV1642 |
| Inductor 112 | 2.2UH |
| Resistor 86, 88, 92, 63, 65 | 10K, 1% |
| Resistor sistor 90 | 4.99K, 1% |
| Resistor 100 | 20K, 5% |
| Resistor 102, 110, 124, 126 | 1K, 5% |
| Resistor 108 | 510 ohms, 5% |
| Resistor 118 | 12K, 5% |
| Resistor 120 | 51K, 5% |
| Capacitor 96 | 10pf, 5% |
| Capacitor 98 | 330pf, 5% |
| Capacitor 106 | 15pf, 5% |
| Capacitor 114, 116 | 220pf, 5% |
| Capacitor 123 | 470pf, 5% |

In the preferred embodiment of the present invention as a readout clock generator for a rotating magnetic memory, the circuitry shown in FIG. 2 is incorporated into a Data General Corporation model 6063, 6064, or 6065 disc drive unit. Computer 10 is Data General Corporation's NOVA 3 series computer, e.g., a NOVA 3/4, 3/12, or 3/D, with the central processing unit and controllers normally incorporated into the NOVA 3 series computers.

The invention may be embodied in yet other specific forms without departing from the spirit or essential characteristics thereof. E.g., the circuitry shown in FIG. 2 may be utilized with self-clocking codes other than the specific MFM example described herein, with appropriate changes in the logic of phase comparator 52 and/or delay circuit 56 and decoder 80. Similarly, as described above, phase comparator 52 may be utilized to recover a separately provided clock signal, rather than recovering a clock signal contained within a self-clocking code. Also, the phase locked loop circuitry may be utilized in data communications other than between a magnetic memory unit or a remote terminal and a computer, e.g., for communications between two terminals or computers. Thus, the present embodiments are to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A circuit for providing a comparison signal representing phase relationship between a first clock pulse train and a variable rate input pulse train, comprising:
    means for measuring phase difference between each pulse of said input pulse train and a respective pulse of said first clock pulse train, said phase difference having a minimum value and a maximum value and related discontinuities at said minimum and maximum values;
    means responsive to operation of said measuring means for generating a first signal proportional to said phase difference;
    means for providing a second signal representing a selected value of said phase difference, said selected value being greater than said minimum value and less than said maximum value; and,
    means for comparing said first and second signals to provide said comparison signal which represents difference between said selected and measured phase difference.

2. The circuit of claim 1 wherein the frequency of said first clock pulse train is twice the highest frequency of said input pulse train.

3. The circuit of claim 2 wherein said input pulse train has a plurality of frequencies each of which is a subharmonic of said frequency of said first clock pulse train.

4. A circuit for providing a first clock pulse train phase synchronized to a variable rate input pulse train comprising:
    means for measuring phase difference between each pulse of said input pulse train and a respective pulse of said first clock pulse train, said phase difference having a minimum value and a maximum value and related discontinuities at said minimum and maximum values;
    means responsive to operation of said measuring means for generating a first signal proportional to said phase difference;
    means for providing a second signal representing a selected value of said phase difference, said selected value being greater than said minimum value and less than said maximum value;
    means for comparing said first and second signals to provide a comparison signal which represents difference between said selected and measured phase difference; and,
    means controlled by said comparison signal for generating said first clock pulse train.

5. The circuit of claim 4 wherein the frequency of said first clock pulse train is twice the highest frequency of said input pulse train.

6. The circuit of claim 4 further comprising means responsive to operation of said first clock pulse train generator for generating a second clock pulse train in phase synchronization with said input pulse train and having a frequency equal to said highest frequency of said input pulse train.

7. The circuit of claims 5 or 6 wherein said input pulse train has a plurality of frequencies, each of which is a subharmonic of said frequency of said first clock pulse train.

8. A readback clock circuit for use with a rotating magnetic memory to provide a first clock pulse train phase synchronized with an input pulse train from said memory, comprising:
    means for measuring phase difference between each pulse of said input pulse train and a respective pulse of said first clock pulse train, said phase difference having a minimum value of zero and a maximum value and related discontinuities at said minimum and maximum values;
    means responsive to operation of said measuring means for generating a first signal proportional to said phase difference;
    means for providing a second signal representing a selected value of said phase difference, said selected value being greater than said minimum value and less than said maximum value;
    means for comparing said first and second signals to provide a comparison signal which represents difference between said selected and measured phase difference; and,
    means controlled by said comparison signal for generating said first clock pulse train.

9. The circuit of claim 8 wherein the frequency of said first clock pulse train is twice the highest frequency of said input pulse train.

10. The circuit of claim 9 wherein said input pulse train is a digital data stream in self-clocking code, said input pulse train having a plurality of frequencies, each of which is a subharmonic of said frequency of said first clock pulse train.

11. The circuit of claims 9 or 10 further comprising means responsive to operation of said first clock pulse train generator for generating a second clock pulse train in phase synchronization with said input pulse train and having a frequency equal to said highest frequency of said input pulse train.

12. The circuit of claim 10 further comprising means for decoding said input digital data stream to provide a data stream output in binary code, said decoding means comprising:
    means responsive to operation of said first clock pulse train generator for generating a second clock pulse train in phase synchronization with said input data stream and having a frequency equal to said highest frequency of said input data stream;
    means for detecting the occurrence of each said pulse of said input data stream; and
    means responsive to operation of said input data pulse detection means and said second clock pulse train generating means for sampling said second clock pulse train upon said occurrence of each said input data stream pulse, said sampled second clock pulse train being provided as said decoded data output.

13. The circuit of claims 1, 4 or 8 wherein said measuring means comprises
 means for generating a first timing pulse for each pulse of said input pulse train, said first timing pulse beginning upon occurrence of a timing edge of said input pulse;
 means responsive to operation of said first timing pulse generating means and to timing edges of said first clock pulse train for generating a second timing pulse for each said first timing pulse, said second timing pulse beginning upon occurrence of first said timing edge of said first clock pulse train following said timing edge of said input pulse and ending upon occurrence of a second said timing edge of said first clock pulse train;
 said first pulse generating means being responsive to operation of said second timing pulse generating means and to said timing edges of said first clock pulse train to end said first timing pulse at said end of said second timing pulse; and,
 said first signal generating means comprises gating means responsive to operation of said first and second timing pulse generating means, said first signal comprising a train of pulses, each said first signal pulse extending from said start of said respective first timing pulse to said start of said respective second timing pulse.

14. The circuit of claim 13 wherein said first and second pulse generating means are integrated circuit flip-flops.

15. The circuit of claim 13 wherein said means for providing said second signal comprises output means connected to said second timing pulse output of said measuring means and divider means for selecting said selected phase difference value, said second signal comprising a train of pulses, each said second signal pulse having a width equal to that of a respective said second timing pulse and an amplitude representing said selected phase difference value.

16. The circuit of claim 15 wherein said comparison means includes means for subtracting said first and second signals to provide said comparison signal.

17. The circuit of claim 15 wherein said gating and said output means are adapted to provide said first and second timing pulse outputs of equal amplitude.

18. The circuit of claim 17 wherein said gating and output means are logic gates contained in a single integrated circuit.

19. The circuit of claim 17 wherein said divider includes means for cancelling offsets in said first and second signals.

20. The circuit of claims 4 or 8 wherein said means for generating said first clock pulse train comprises:
 means for integrating said comparison signal to provide a frequency control voltage; and,
 oscillator means for generating said first clock pulse train, said oscillator means including a frequency determining circuit comprising an inductor and a voltage variable capacitor responsive to said frequency control voltage to determine said frequency of said first clock pulse train.

* * * * *